J. ZBRANEK.
PLOW.
APPLICATION FILED AUG. 6, 1919.
1,346,436.
Patented July 13, 1920.
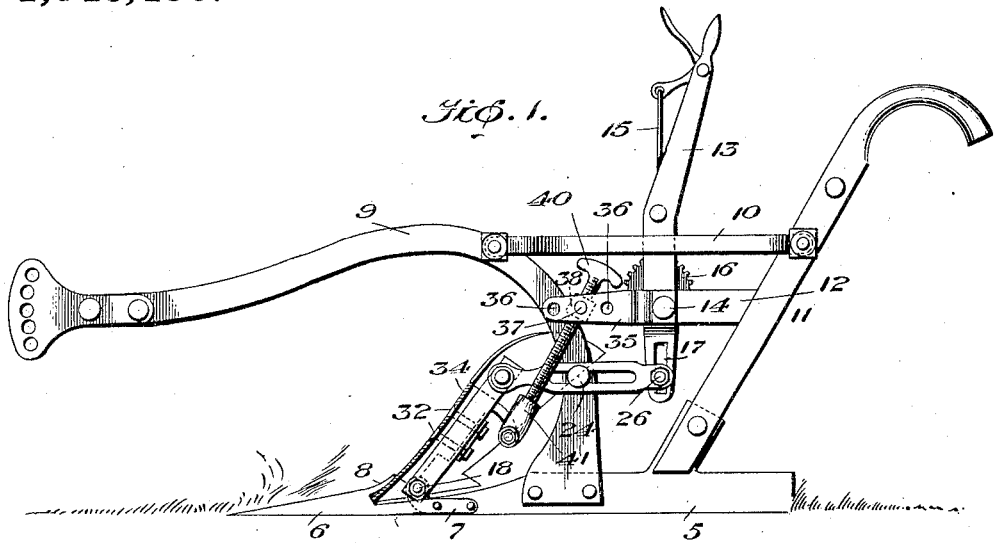
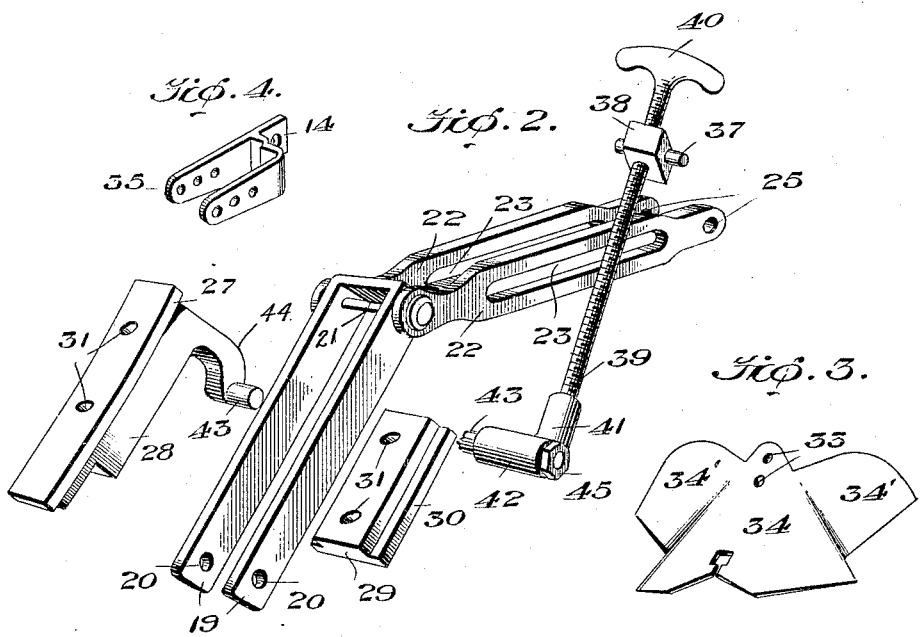
Witness
Inventor
J. Zbranek
By
Attorney

UNITED STATES PATENT OFFICE.

JOSEPH ZBRANEK, OF HALLETTSVILLE, TEXAS.

PLOW.

1,346,436.  Specification of Letters Patent.  Patented July 13, 1920.

Application filed August 6, 1919. Serial No. 315,644.

*To all whom it may concern:*

Be it known that I, JOSEPH ZBRANEK, a citizen of the United States of America, residing at Hallettsville, in the county of Lavaca and State of Texas, have invented certain new and useful Improvements in Plows, of which the following is a specification.

The primary object of the present invention is to provide a plow in which the share thereof is capable of vertical and angular adjustments, the adjustments in each instance being independently controlled, the subject matter of the present invention particularly residing in the novel arrangement of parts for causing the vertical adjustment of the plow share.

It is also contemplated to provide a detachable share so that plow shares of different constructions for operating in different classes of soil and also for performing different functions may be employed upon the present improved form of share mount so that a vertical and angular adjustment of any form of plow share may be obtained.

With these general objects in view and others that will appear as the nature of the invention is better understood, the same consists in the novel construction, combination and arrangement of parts to be hereinafter more fully described and then claimed, and in which reference is had to the accompanying drawing by like characters designating corresponding parts throughout the several views, in which, Figure 1 is a side elevational view of a plow constructed in accordance with the present invention, the detachable plow share being shown in section, Fig. 2 is a detached developed perspective view of the coöperating parts for obtaining a vertical adjustment of the plow share.

Fig. 3 is a detail perspective view of another form of plow share known as the middle buster that may be employed upon the present mount, and Fig. 4 is a detail detached perspective view of the bracket arms for supporting the adjusting screw.

The present invention particularly residing in the device for obtaining a vertical adjustment of a plow share, the remaining elements will be briefly described, there being illustrated a ground runner 5 carrying a detachable plow point 6 at the forward end thereof, the same being connected to the runner 5 by the rearwardly extending forked projection 7 straddling the said runner while a rearwardly and upwardly directed inclined flange 8 is carried by said point. The usual form of plow beam 9 extends forwardly of the runner 5 and has connected thereto braces 10 which are attached at their rear ends to the handle arms 11 secured to the runner 5.

A bar 12 extends from one of the handle arms 11 to the plow beam 9, the bar being rigidly connected thereto and forming a support for a part of the mechanism. A lever 13 is pivoted as at 14 to the bar 12 and carries a hand controlled pawl device 15 coöperating with the rack segment 16 while the lower end of the lever 13 beyond the pivot point 14 is slotted as at 17.

An upstanding lug 18 is carried by the forward end of the runner 5 slightly spaced rearwardly of the flange 8 upon the plow point 6 and forms a pivot bearing for the lower ends of the side bars 19 of a U-shaped member more clearly shown in Fig. 2, the lower ends of the members 19 straddling the lug 18 with a bolt passing through openings 20 in the members 19 and a registering opening formed in the lug 18. A bolt 21 extends across the upper ends of the side members 19 and projects slightly beyond the same and has pivotally connected to each end thereof a link 22, the links being arranged at opposite sides of the plow beam 9 and being longitudinally slotted as at 23 through which slots oppositely directed pins 24 carried by the plow beam extend while the other ends of said links 22 are provided with openings 25 through which a pivot bolt 26 extends, the bolt working in the slot 17 of the lever 13 while the links 22 straddle said lever. It will be readily understood that by shifting the lever 13 upon its pivot point 14, the angularity of the plow share supporting arms 19 may be readily changed through the link and slot connections hereinbefore described.

The improved devices for varying the height of the plow share include the mechanism more clearly shown in Fig. 2 embodying a shoe 27 having a reduced central base extension 28 that is adapted to be freely disposed between the side bars 19, while a base plate 29 extends between said side bars 19 for engagement with the shoe base 28, the base plate 29 being laterally flanged as at 30 to limit the inward movement thereof, while registering openings 31 are provided in the shoe and base plate for the reception of bolts 32 extending through openings 33 in the blades 34 and retained in position by nuts secured upon the inner ends of said bolts as illustrated in Fig. 1.

A pair of spaced arms 35 shown more clearly in Fig. 1 is fixed to the pivot point 14 of the lever 13, the same being provided with spaced alined openings 36 into which projecting pins 37 carried by the screw block 38 are adapted to extend, a relatively long screw 39 operatively associated with said screw block 38 has an operating handle 40 upon its upper end. The lower end of the screw 39 has a swivel connection with the projection 41 of a journal bearing 42, the journal bearing 42 receiving therein the pin 43 carried by the inwardly directed curved arm 44 carried by the shoe base member 28 and projecting inwardly of the side bars 19, the end of the pin 43 being threaded for the reception of a lock nut 45 upon the projecting end thereof. By manipulating the screw 39, through the bearing connections 42, 43, shoe 27, the height of the plow share 34 may be readily changed, either upwardly or downwardly as the shoe 27 and base plate 29 connected thereto slides upon the side bars 19 which constitute a guide therefor. The blade shown in Fig. 3 includes lateral wings 34' which differ from the plain sides of the blade shown in Fig. 1, and constitute a middle buster.

In the operation of the plow, the lower end of the blade normally projects beneath the plow point flange 8, which flange constitutes a guide and protector for the lower end of the plow share while the angularity of the plow share is readily changed by the operation of the lever 13 as above described, the vertical adjustment of the plow share being accomplished by operating the screw 39 with its coöperating parts.

While the preferred forms of the invention are herein illustrated, it is to be understood that the details of the construction may be changed when the device is operatively constructed wherein such changes will fall within the scope of the invention.

What I claim is:—

A plow comprising a runner, a plow beam carried by the runner, handle arms supported rearwardly of the plow beam, a plow point fixed to the forward end of the runner, an inverted U-shaped frame pivotally mounted at its lower end to the runner, links connected to the upper end of said frame and slidably supported intermediate the ends on the beam, a lever having a bolt and slot connection with the other ends of said links for shifting the links and frame to vary the inclination of the frame, a shoe slidably mounted between the bars of the frame, means for shifting the shoe in the frame, means for holding the shoe in adjusted positions, and a blade fixed to said shoe.

In testimony whereof I affix my signature.

JOSEPH ZBRANEK.